United States Patent
Sugimoto et al.

(10) Patent No.: US 10,093,276 B2
(45) Date of Patent: Oct. 9, 2018

(54) STEERING LOCK DEVICE

(71) Applicants: ALPHA CORPORATION, Yokohama-shi, Kanagawa (JP); NISSAN MOTOR CO., LTD., Yokohama-shi, Kanagawa (JP)

(72) Inventors: Koichiro Sugimoto, Yokohama (JP); Kenjirou Hayashi, Atsugi (JP)

(73) Assignees: ALPHA CORPORATION, Yokohama-Shi, Kanagawa (JP); NISSAN MOTOR CO., LTD., Yokohama-Shi, Kanagawa (JP)

( * ) Notice: Subject to any disclaimer, the term of this patent is extended or adjusted under 35 U.S.C. 154(b) by 84 days.

(21) Appl. No.: 15/026,829

(22) PCT Filed: Sep. 5, 2014

(86) PCT No.: PCT/JP2014/073473
§ 371 (c)(1),
(2) Date: Apr. 1, 2016

(87) PCT Pub. No.: WO2015/049952
PCT Pub. Date: Apr. 9, 2015

(65) Prior Publication Data
US 2016/0236650 A1    Aug. 18, 2016

(30) Foreign Application Priority Data
Oct. 3, 2013    (JP) .................................. 2013-208133

(51) Int. Cl.
B60R 25/02    (2013.01)
B60R 25/021    (2013.01)
B60R 25/0215    (2013.01)

(52) U.S. Cl.
CPC ........ B60R 25/0211 (2013.01); B60R 25/021 (2013.01); B60R 25/02153 (2013.01);
(Continued)

(58) Field of Classification Search
CPC ............... B60R 25/0211; B60R 25/021; B60R 25/02153; Y10T 70/5956; Y10T 70/5664;
(Continued)

(56) References Cited

U.S. PATENT DOCUMENTS 6,003,349 A * 12/1999 Nagae ............... B60R 25/02115
70/186
6,439,011 B1 * 8/2002 Frick ................. B60R 25/02153
70/185

(Continued)

FOREIGN PATENT DOCUMENTS

JP    10-264770 A    10/1998
JP    2004-231122 A    8/2004
(Continued)

OTHER PUBLICATIONS

International Search Report for corresponding international application PCT/JP2014/073473 with English translation.
(Continued)

*Primary Examiner* — Suzanne L Barrett
*Assistant Examiner* — Morgan J McClure
(74) *Attorney, Agent, or Firm* — Nath, Goldberg & Meyer; Jerald L. Meyer; Stanley N. Protigal

(57) ABSTRACT

A fragile part (15) which is set to have lower load resistance than other positions of a frame (10) is provided on a guide part (12) at a position that overlaps with a linkage portion (50a) between a hanger (52) and a lock body (51) of a lock member (50) positioned in a steering lock release position.

4 Claims, 13 Drawing Sheets

(52) U.S. Cl.
CPC .......... *Y10T 70/565* (2015.04); *Y10T 70/5664* (2015.04); *Y10T 70/5956* (2015.04)

(58) Field of Classification Search
CPC ............... Y10T 70/565; Y10T 70/5659; Y10T 70/5668; Y10T 70/5646; Y10T 70/5655; Y10T 70/5757; Y10T 70/5889; Y10T 70/596; Y10T 70/5681; Y10T 70/5765; Y10T 70/577; E05B 17/20; E05B 77/44; E05B 79/02
See application file for complete search history.

(56) References Cited

U.S. PATENT DOCUMENTS

| | | | | |
|---|---|---|---|---|
| 6,655,225 | B1* | 12/2003 | Nagai | F16C 29/008 74/89.33 |
| 6,810,700 | B2* | 11/2004 | Okuno | B60R 25/02126 70/186 |
| 6,915,671 | B2* | 7/2005 | Zillmann | B60R 25/02153 70/186 |
| 6,931,896 | B2* | 8/2005 | Ochi | B60R 25/02113 70/182 |
| 7,021,093 | B2* | 4/2006 | Fukatsu | B60R 25/02153 70/186 |
| 7,104,097 | B2* | 9/2006 | Zillmann | B60R 25/02153 70/186 |
| 7,121,126 | B2* | 10/2006 | Zillmann | B60R 25/02153 70/186 |
| 7,363,785 | B2* | 4/2008 | Limburg | B60R 25/02153 70/186 |
| 7,703,309 | B2* | 4/2010 | Okuno | B60R 25/02153 384/202 |
| 7,823,426 | B2* | 11/2010 | Okuno | B60R 25/02153 384/202 |
| 8,646,295 | B2* | 2/2014 | Sugimoto | B60R 25/02 70/186 |
| 8,925,416 | B2* | 1/2015 | Okada | B60R 25/0211 70/252 |
| 9,032,769 | B2* | 5/2015 | Villagrasa | B60R 25/0211 70/186 |
| 9,221,427 | B2* | 12/2015 | Bodtker | B60R 25/0215 |
| 9,278,669 | B2* | 3/2016 | Yoshida | B60R 25/02126 |
| 9,731,681 | B2* | 8/2017 | Behrens | B60R 25/0211 |
| 2004/0148983 | A1* | 8/2004 | Suzuki | B60R 25/02153 70/186 |
| 2010/0064742 | A1* | 3/2010 | Okada | B60R 21/05 70/185 |

FOREIGN PATENT DOCUMENTS

| | | | |
|---|---|---|---|
| JP | 38313891 | * 7/2006 | .......... B60R 25/021 |
| JP | 2008-238950 A | 10/2008 | |
| WO | 2008/056727 A1 | 5/2008 | |
| WO | 2008/056728 A1 | 5/2008 | |
| WO | 2008/123073 A1 | 10/2008 | |

OTHER PUBLICATIONS

English translation of International Preliminary Report on Patentability (Chapter II of the PCT: PCT/IB/338, PCT/IPEA/409) for corresponding PCT/JP2014/073473.

* cited by examiner

STEERING LOCK DEVICE

This is a National Phase Application filed under 35 U.S.C. 371 as a national stage of PCT/JP2014/073473, filed Sep. 5, 2014, an application claiming the benefit of Japanese Patent Application No. 2013-208133, filed Oct. 3, 2013, the content of each of which is hereby incorporated by reference in its entirety.

TECHNICAL FIELD

The present invention relates to a steering lock device that limits rotation of a steering shaft of a vehicle.

BACKGROUND

As this type of a conventional steering lock device, one that is disclosed in Patent Literature 1 (Japanese Patent Application Laid-Open Publication No. 2004-231122) is known. FIG. 1 shows a structure of a steering lock device described in Patent Literature 1. This steering lock device 101 is provided with a lock member 150 for prohibiting rotation of a steering shaft 180. Moreover, the lock member 150 is movably arranged between a steering lock position at which the tip of the lock member 150 protrudes from a guide part 112 of a frame 110 and a steering lock release position at which the tip of the lock member 150 is accommodated within the guide part 112. Further, this steering lock device 101 is provided with a breaking structure 170 as a protection mechanism for a driver in a collision accident or the like. The breaking structure 170 is composed of a groove-shaped fragile part 171 formed on a hanger 152 that constitutes the lock member 150 and a groove-shaped coupling part 172 formed on the frame 110. The fragile part 171 is formed at a position of the hanger 152 that overlaps with the coupling part 172 in a state that the lock member 150 is positioned at a steering lock release position. The breaking structure 170 restrains entry of reaction force to an on-vehicle load by breaking when excessive external force is applied such as by the on-vehicle load striking against the steering lock device 101 in a collision accident or the like. Furthermore, this steering lock device 101 is provided with an auxiliary lock mechanism 160. When the breaking structure 170 breaks, an auxiliary lock member 161 engages with a lock body 151 that constitutes the lock member 150 to retain the lock member 150 in the steering lock release position.

LITERATURE LIST

Patent Literature

Patent Literature 1: Japanese Patent Application Laid-Open Publication No. 2004-231122

SUMMARY OF THE INVENTION

Problem to be Solved by the Invention

However, in the conventional steering lock device 101 described above, there is a possibility that time difference occurs from the time when the breaking structure 170 breaks before the auxiliary lock mechanism 160 functions and that the lock body 151 may move to a lock position side before the auxiliary lock member 161 engages with the lock body 151.

Considering the above circumstances, the present invention aims to provide a steering lock device in which the auxiliary lock structure functions certainly when the frame is separated.

Means to Solve the Problem

In order to achieve the above object, a first aspect of the present invention provides a steering lock device, which includes a lock member arranged to be displaceable between a steering lock release position at which it is accommodated within a guide hole formed in a guide part that constitutes a frame and a steering lock position at which its tip protrudes from the guide part, the lock member having a hanger and a lock body that are disengageably linked; an auxiliary lock mechanism which comprises an auxiliary lock receiving part arranged on either one of the guide part or the lock body, an auxiliary lock member arranged on the other of the guide part or the lock body to be biased toward the auxiliary lock receiving part, and arranged to be displaceable between an auxiliary lock position at which it engages with the auxiliary lock receiving part and an auxiliary lock stand-by position at which it does not engage with the auxiliary lock receiving part, and a holding member that engages with the auxiliary lock member and holds the auxiliary lock member in the auxiliary lock stand-by position, in which the auxiliary lock mechanism restricts displacement of the lock member positioned in the steering lock release position by the auxiliary lock member moving to the auxiliary lock position to engage with the lock member when engagement of the holding member and the auxiliary lock member is released; and a fragile part provided on the guide part at a position that overlaps with a linkage portion between the hanger and the lock body of the lock member positioned in the steering lock release position, the fragile part being set to have lower load resistance than other positions of the frame.

A holding hole which is formed in the guide part and in which the holding member is arranged may be set to have a larger dimension on the fragile part side along a given direction that an external load enters than a dimension on the auxiliary lock member side.

At the linkage portion between the hanger and the lock body, a hanger-side linkage part provided on the hanger may be composed of an L-shaped protrusion that protrudes from a deeper side to a nearer side with respect to a given load entry direction, and at the linkage portion, the hanger and the lock body may be linked by the hanger-side linkage part and a body-side linkage part provided on the lock body engaging in a longitudinal direction of the lock member.

A position of the guide hole that overlaps with the fragile part may expand toward a deeper side with respect to a given direction that an external load enters.

Advantageous Effect of the Invention

According to the first aspect of the present invention, in an operation to release the engagement of the hanger and the lock body, a load at the time of the separation can be made smaller as compared with an operation to break the hanger. Therefore, it becomes possible to make the auxiliary lock mechanism function certainly as compared with a structure in which the guide part and the hanger are broken.

Moreover, by arranging the fragile part at a position of the guide part that overlaps with the linkage portion of the lock member positioned at the steering lock release position, the linkage portion becomes exposed from the fragile part after separation. In other words, since a space is formed around the linkage portion when the fragile part is separated, play is generated at the linkage portion, and the timing that the linkage of the linkage portion is disconnected can be delayed as compared with the timing that the fragile part is separated. Thus, since additional time is generated for the auxiliary lock member of the auxiliary lock mechanism to move to the auxiliary lock position, it is possible to make the auxiliary lock mechanism act certainly.

In a case that the dimension on the fragile part side along a given direction that an external load enters is set to be larger than the dimension on the auxiliary lock member side, when external force is applied to the frame along the given load entry direction, the holding member falls within the holding hole. Thus, the engagement between the holding member and the auxiliary lock member can be released, and it is possible to shorten the time for the auxiliary lock mechanism to function and it is possible to make the auxiliary lock mechanism act certainly.

In a case that the hanger-side linkage part is composed of a protrusion that protrudes from the deeper side to the nearer side with respect to the given load entry direction, when the frame is separated, force that heads from the tip end side of the lock body to the bottom end side is applied from the hanger-side linkage part to the body-side linkage part. Thus, delay is generated from the time when the frame is separated before the linkage of the linkage portion is disconnected. Therefore, additional time is generated for the auxiliary lock member of the auxiliary lock mechanism to move to the auxiliary lock position, and it is possible to make the auxiliary lock mechanism act certainly.

In a case that a separation region is provided at a position of the guide hole that overlaps with the linkage portion of the lock member positioned in the steering lock release position, a larger space is formed around the linkage portion. Thus, due to play generated at the linkage portion, the timing that the linkage of the linkage portion is disconnected can be delayed further as compared with the timing that the fragile part is separated.

DESCRIPTION OF EMBODIMENTS OF THE INVENTION

Figure 1:
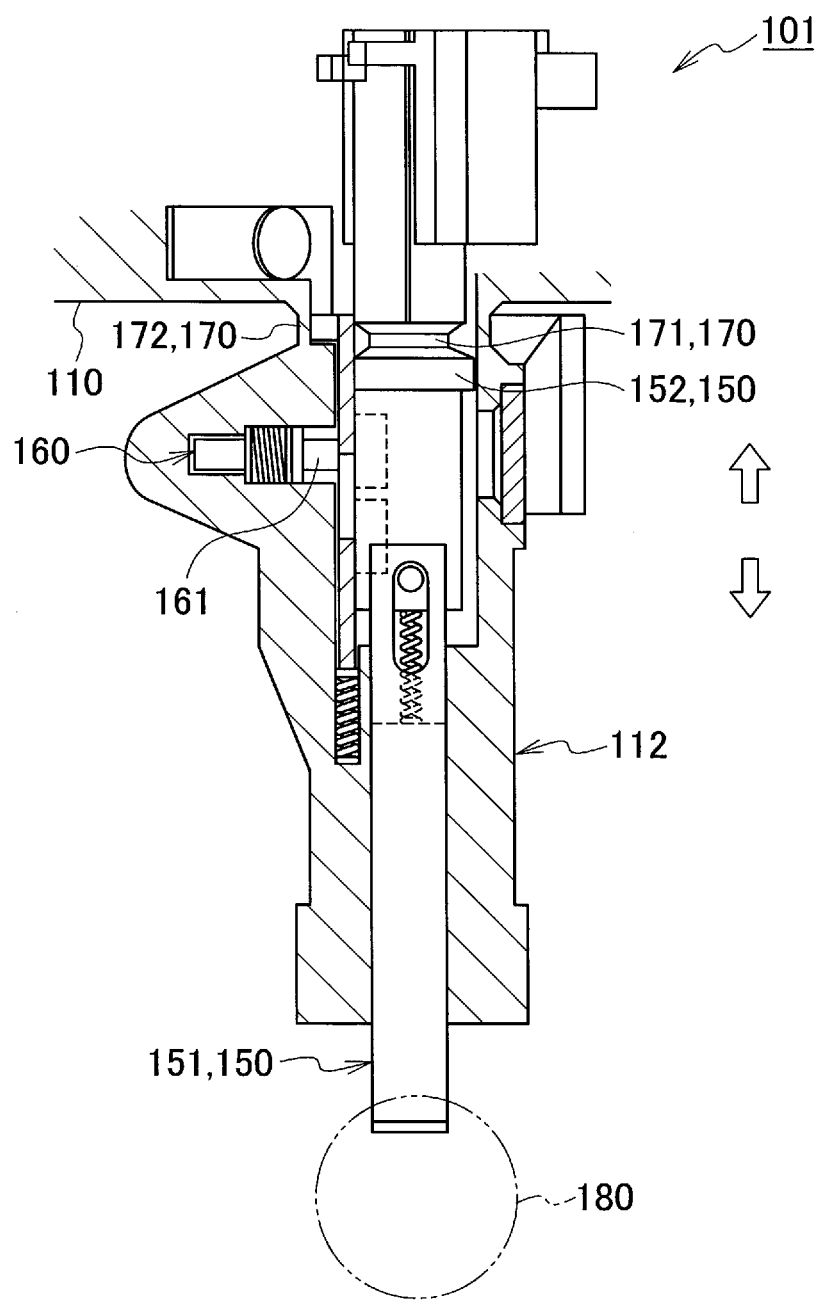
FIG. 1 is an outline cross sectional view showing an electric steering lock device according to conventional technology.
Figure 2:
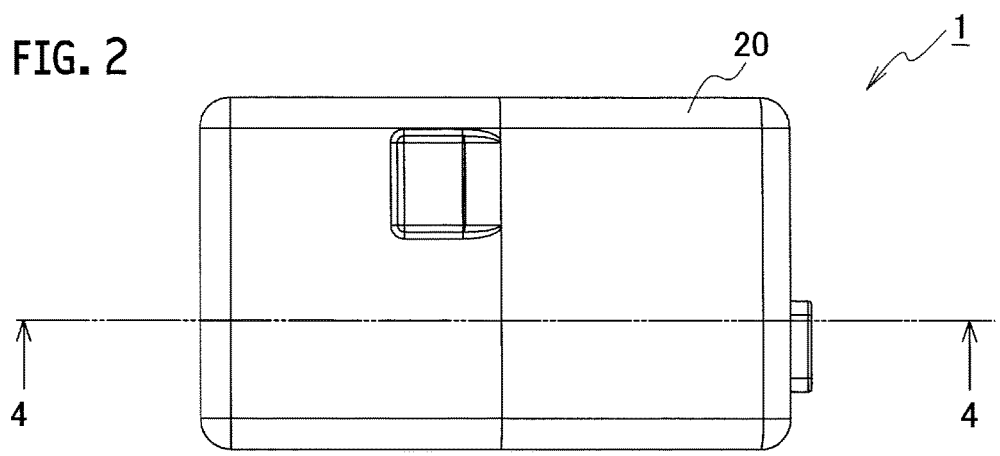
FIG. 2 shows one embodiment of the present invention and is a plan view showing an electric steering lock device.
Figure 3:
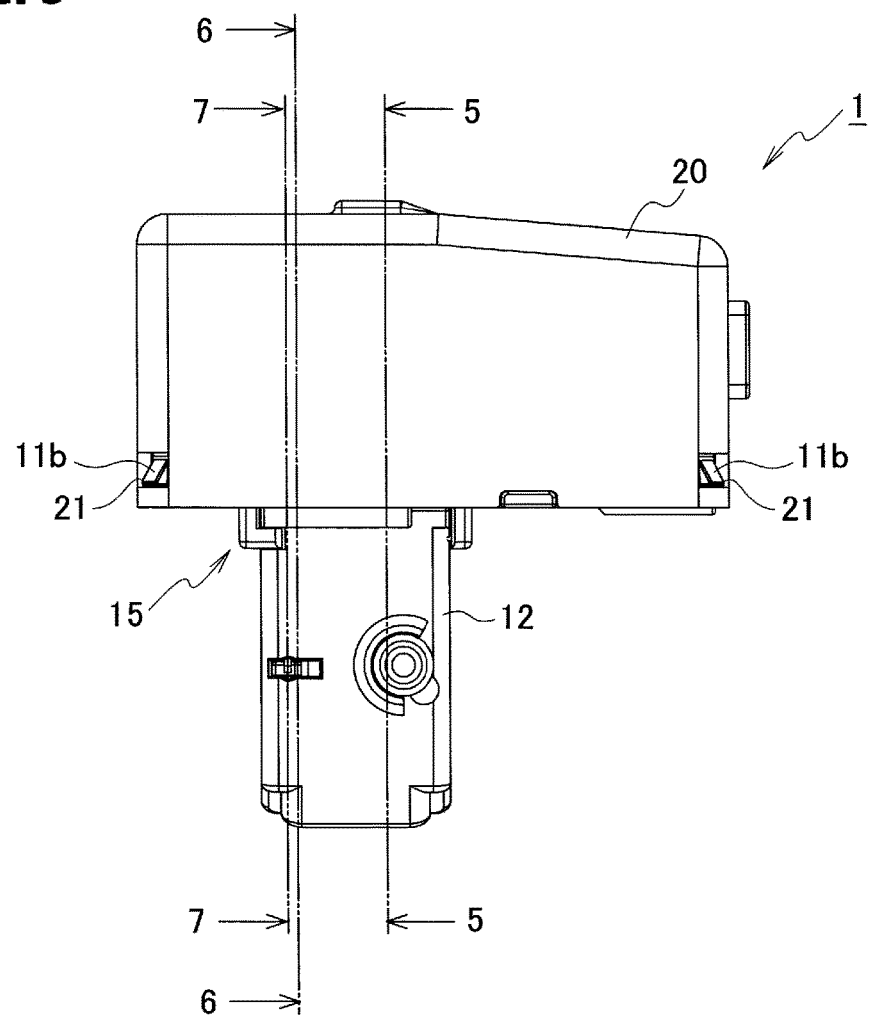
FIG. 3 shows one embodiment of the present invention and is a front view showing the electric steering lock device.
Figure 4:
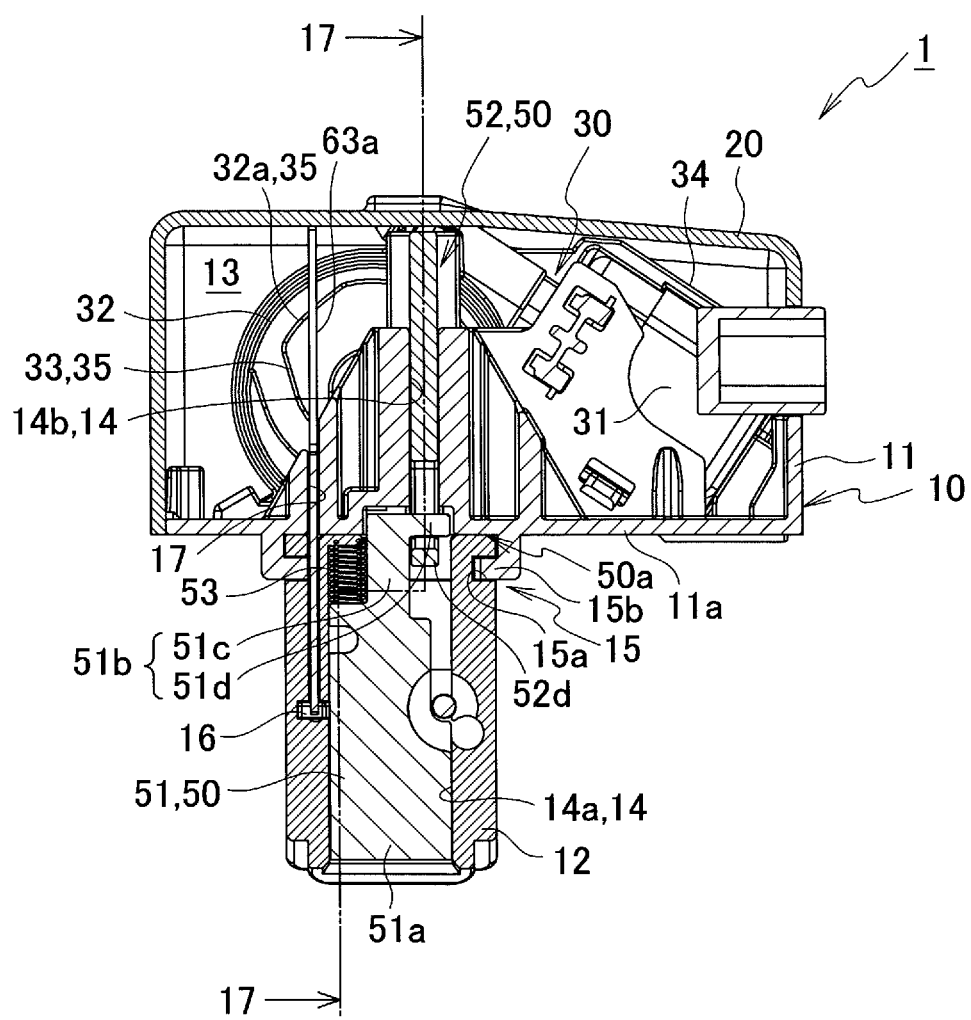
FIG. 4 is a cross sectional view taken along line 4-4 of FIG. 2 at the time of lock release.
Figure 5:
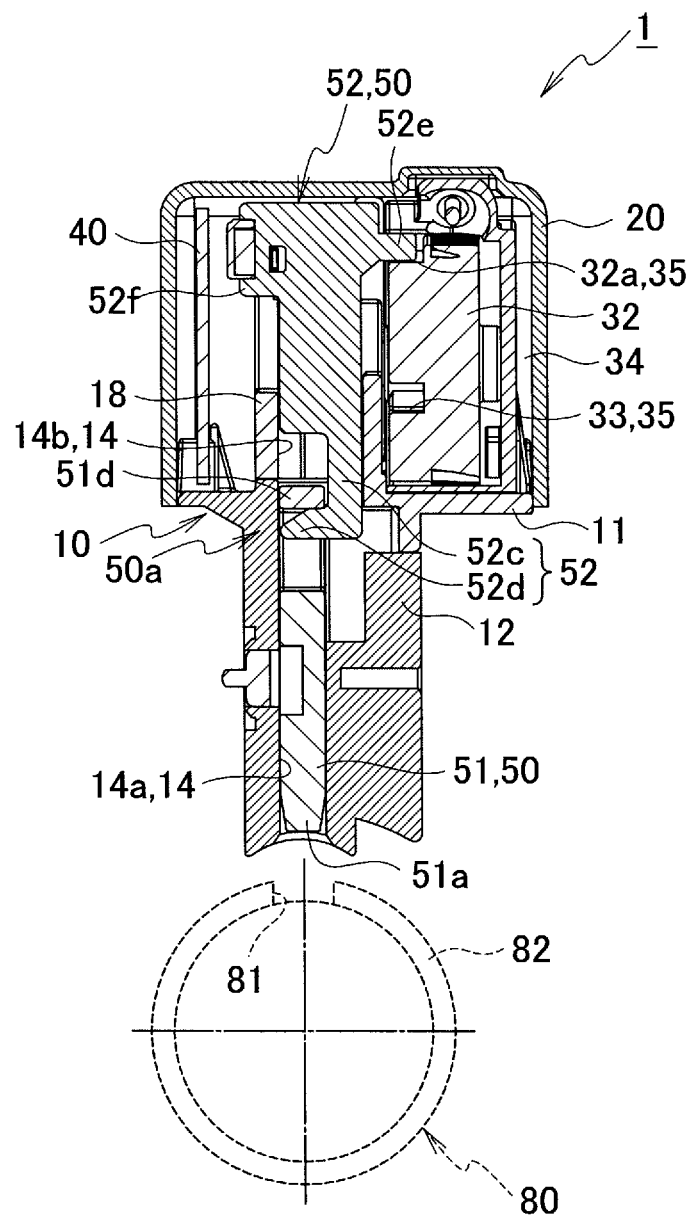
FIG. 5 is a cross sectional view taken along line 5-5 of FIG. 3 at the time of lock release.
Figure 6:
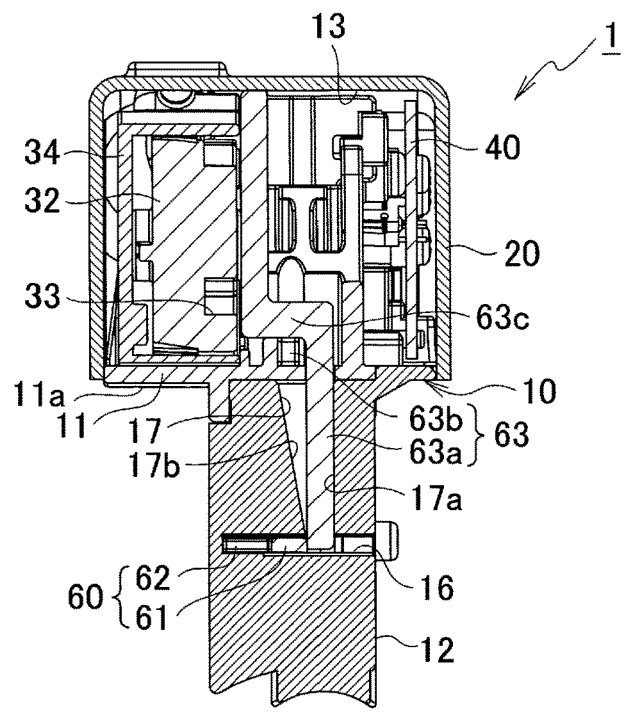
FIG. 6 is a cross sectional view taken along line 6-6 of FIG. 3 at the time of lock release.
Figure 7:
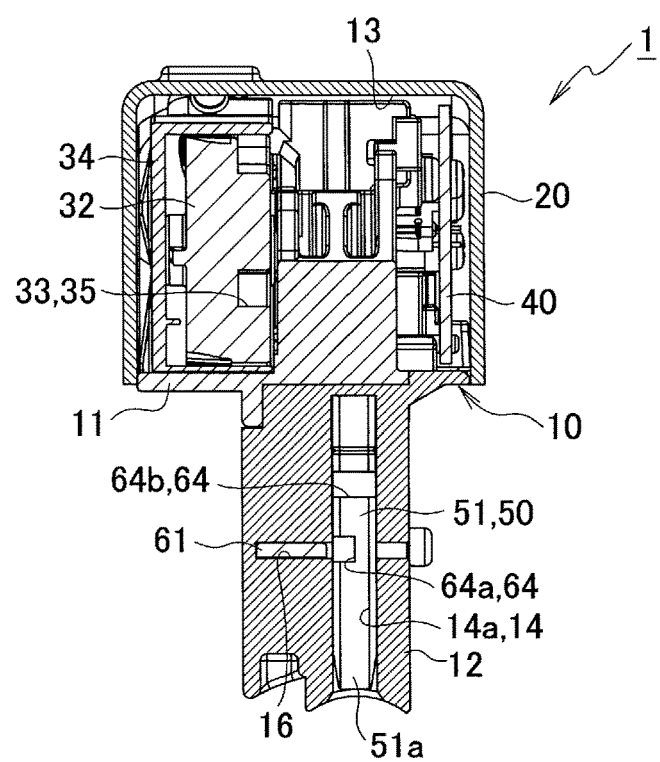
FIG. 7 is a cross sectional view taken along line 7-7 of FIG. 3 at the time of lock release.
Figure 8:
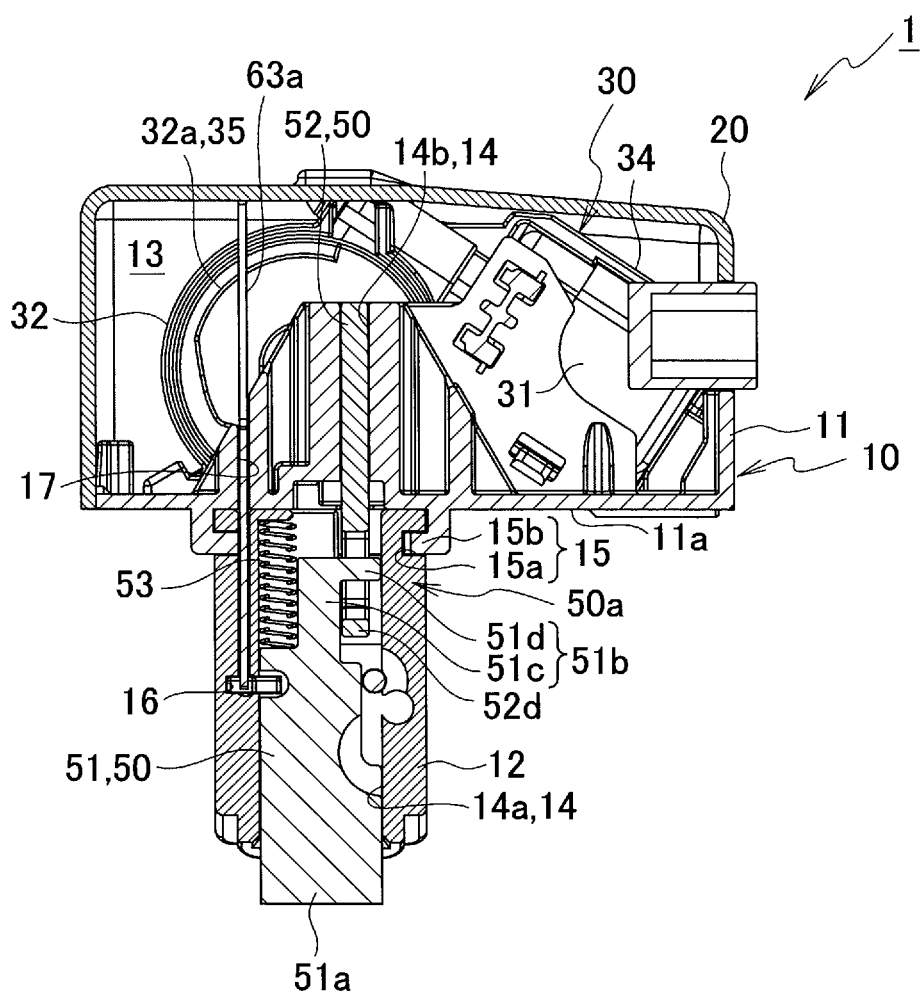
FIG. 8 is a cross sectional view taken along line 4-4 of FIG. 2 at the time of locking.
Figure 9:
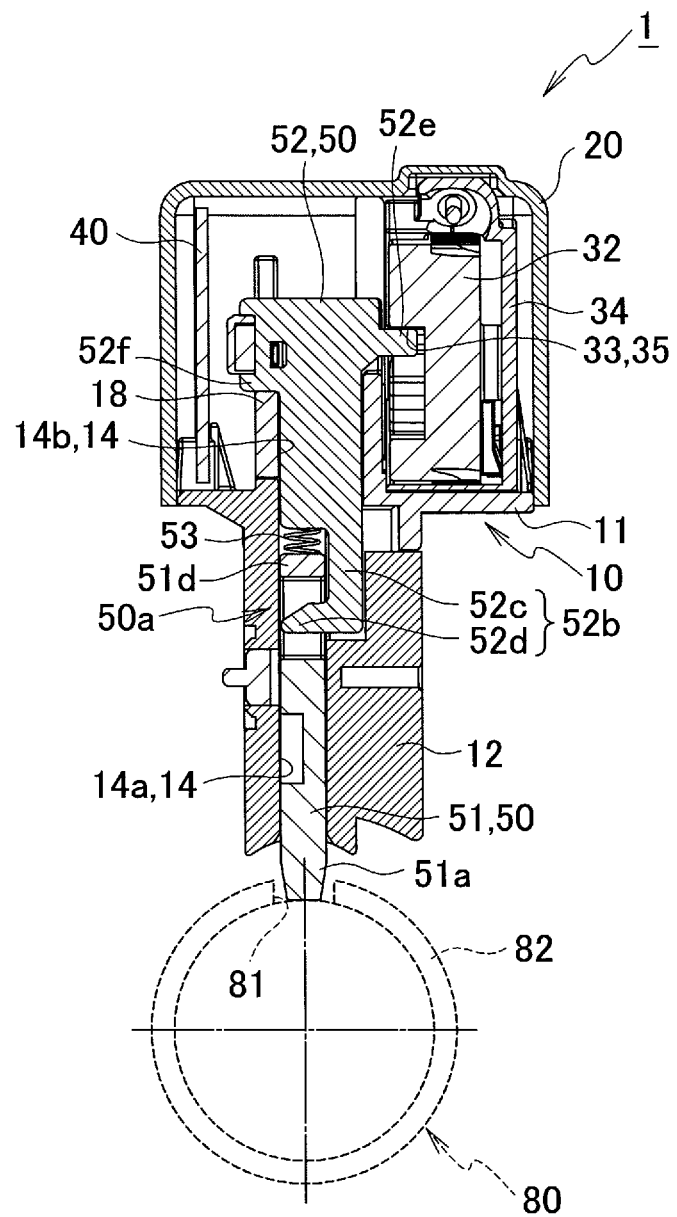
FIG. 9 is a cross sectional view taken along line 5-5 of FIG. 3 at the time of locking.
Figure 10:
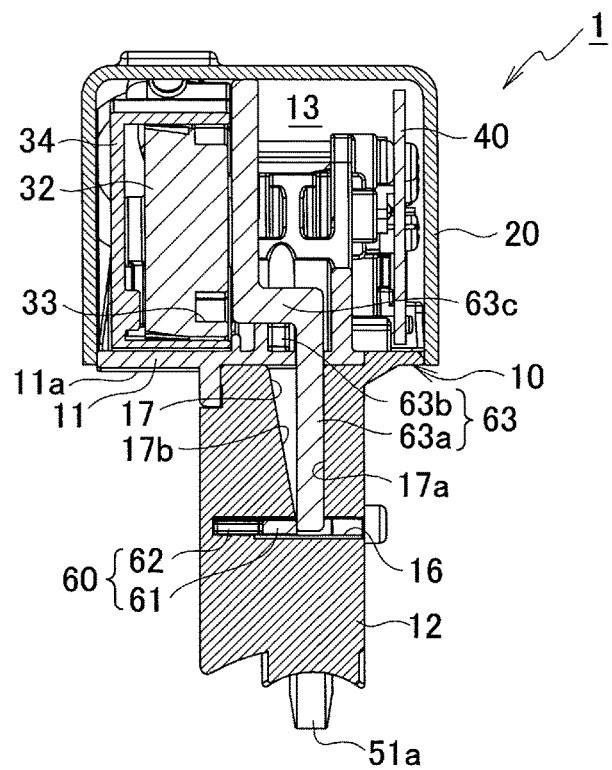
FIG. 10 is a cross sectional view taken along line 6-6 of FIG. 3 at the time of locking.
Figure 11:
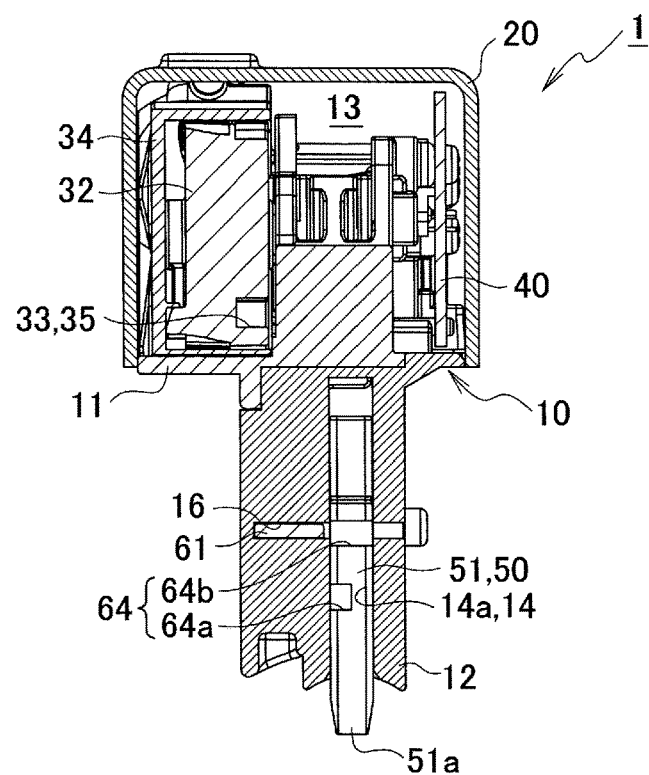
FIG. 11 is a cross sectional view taken along line 7-7 of FIG. 3 at the time of locking.

Hereinafter, an embodiment of the present invention will be explained by referring to the drawings. A steering lock device according to this embodiment is attached to a steering column device (not shown) which accommodates a steering shaft 80 of a vehicle by a fixing means (not shown), as an electric steering lock device 1. The electric steering lock device 1 is primarily composed of a frame 10, a frame cover 20, a drive means 30, a control board 40, a lock member 50, and an auxiliary lock mechanism 60, as shown in FIG. 2-FIG. 11.

Further, when a vehicle to which the electric steering lock device 1 is installed caused a collision accident or the like, there is a possibility that an on-vehicle load strikes with great force the electric steering lock device 1 due to the shock of the accident or the like. In such a case, external force acts on the electric steering lock device 1 from downward to upward of the vehicle. Hereupon, as a given load entry direction, an entry direction of such external force is regarded as X.

The frame 10 is provided with a case part 11 having a generally box shape one face of which (the upper face in FIG. 4-FIG. 11 or the like) is opened, and a cylindrical guide part 12 arranged on a bottom face 11 a of the case part 11. Moreover, the case part 11 forms a housing chamber 13 inside as a housing space together with the frame cover 20. The case part 11 and the guide part 12 are linked together by an engagement structure 15 as a fragile part at which load resistance is set to be lower than other parts. Then, when a load that is higher than a set value is applied, the engagement structure 15 is disconnected, and the case part 11 and the guide part 12 are separated.

The guide part 12 has a square cylindrical shape that communicates with the housing chamber 13 and that opens to face a steering shaft 80 on its tip side, and the lock member 50 is accommodated in a guide hole 14 which is a cylinder hole so as to freely move back and forth.

The guide hole 14 is a hole that passes through the guide part 12, and is composed of three regions of a lock body region 14a, a hanger region 14b, and a separation region 14c.

The lock body region 14a is set in a range where a later-described lock body 51 moves between a steering lock position and a steering lock release position, and is set to be on a front end side of the guide part 12, and opens to face the steering shaft 80. The hole shape of the guide hole 14 at the lock body region 14a is formed such that the lock body 51 becomes capable of sliding without rattling. Moreover, an auxiliary lock hole 16 in which the auxiliary lock mechanism 60 is accommodated is provided so as to be orthogonal to the guide hole 14 and opens on the inner wall face of the lock body region 14a.

The hanger region 14b is set in a range where a later-described hanger 52 moves between the steering lock position and the steering lock release position, and communicates with the rear end side of the lock body region 14a, and opens to the housing chamber 13. The hole shape of the guide hole 14 at the hanger region 14b is formed such that the hanger 52 becomes capable of sliding without rattling. Moreover, a stopper receiving part 18 which engages with a later-described stopper 52f is set at a housing chamber-side opening part of the hanger region 14b.

Figure 17:
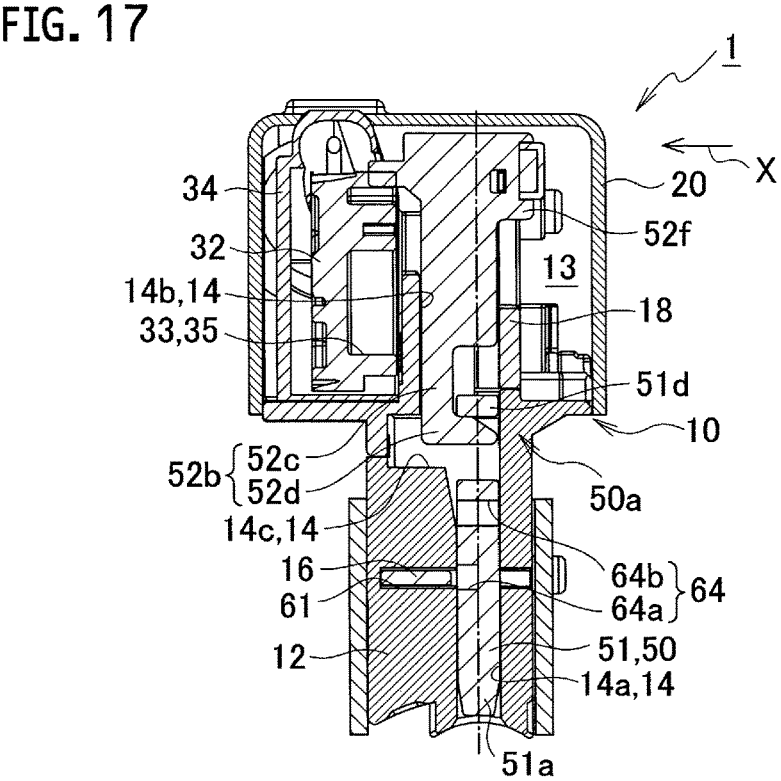
FIG. 17 is a cross sectional view taken along line 17-17 of FIG. 4 showing a state before excessive external force is applied at the time of lock release.
Figure 18:
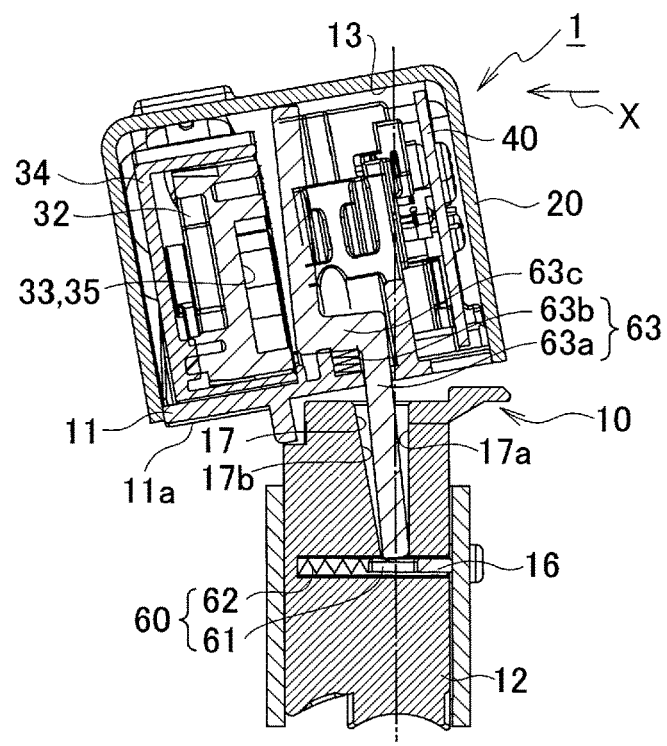
FIG. 18 is a cross sectional view taken along line 6-6 of FIG. 3 showing the circumstances that a case part falls from a guide part by application of excessive external force at the time of lock release.
Figure 19:
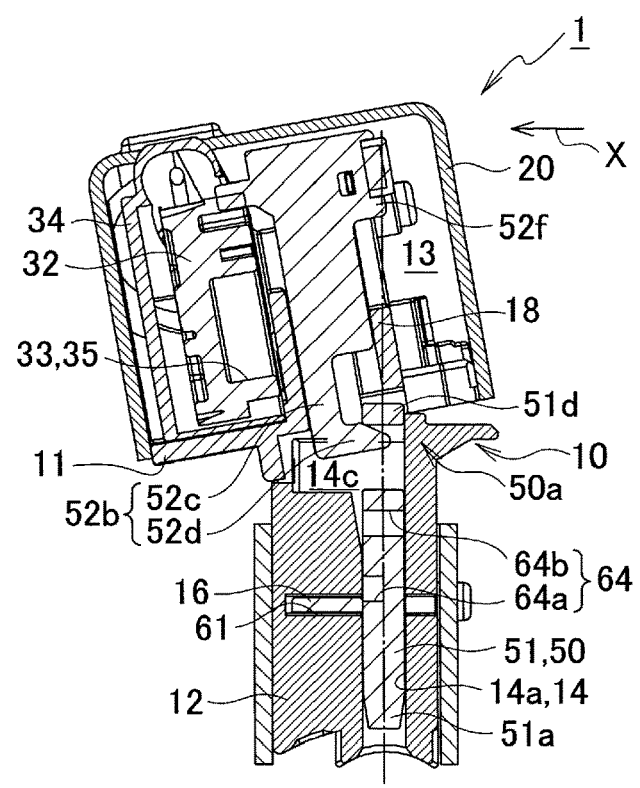
FIG. 19 is a cross sectional view taken along line 17-17 of FIG. 4 showing the circumstances that the case part falls from the guide part by application of excessive external force at the time of lock release.
Figure 20:
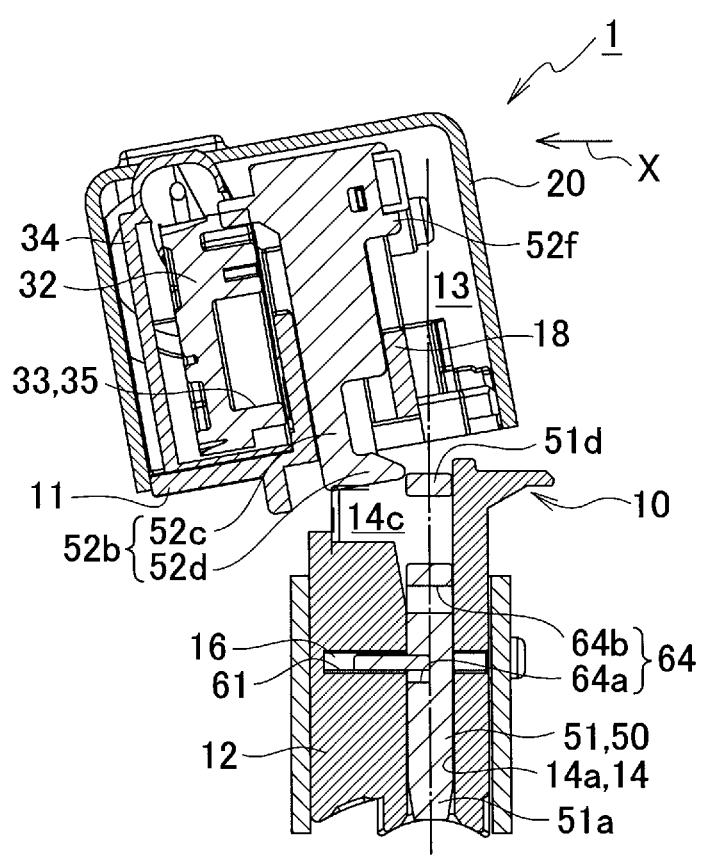
FIG. 20 is a cross sectional view taken along line 17-17 of FIG. 4 showing a state in which the case part has fallen from the guide part by application of excessive external force at the time of lock release and the auxiliary lock mechanism has been operated.

The separation region 14c protrudes to expand toward the deeper side (the left side of a linkage portion 50a in FIG. 17) with respect to an external load entry direction X at a position in the guide hole 14 that overlaps with the linkage portion 50a of the lock member 50 positioned at the steering lock release position.

The engagement structure 15 is composed of an engagement recess 15a and an engagement protrusion 15b, and is set at a position that overlaps with the linkage portion 50a of the lock body 51 and the hanger 52 of the lock member 50 in the steering lock release position. Moreover, the engagement structure 15 is set such that its load resistance is lower than other positions of the frame 10 as a fragile part. The engagement recess 15a is composed of a groove-shaped recess that is orthogonal to a longitudinal direction of the guide hole 14 on the outer side face of the rear end of the guide part 12 (the upper end part of the guide part 12 in FIG. 4). The engagement protrusion 15b is composed of a rail-shaped protrusion that is capable of engagement with the engagement recess 15a at a front end of the case part 11. By the engagement of the engagement recess 15a and the engagement protrusion 15b, the case part 11 and the guide part 12 are integrally composed.

The frame cover 20 has a box-shape that opens on one face (the lower face in FIG. 4-FIG. 11 or the like), and is assembled to the frame 10 by an engagement receiving part 21 provided on an inner edge of the opening part engaging with an engagement part 11b. provided on a peripheral edge of the case part 11 of the frame 10.

The drive means 30 which drives the lock member 50 and the control board 40 which controls operations of the drive means 30 are accommodated in the housing chamber 13.

The drive means 30 is composed of an electric motor 31 as a driving source, a worm gear (not shown) arranged on an output axis of the electric motor 31, and a disc-like worm wheel 32 formed as a gear that is capable of engagement with the worm gear. The worm wheel 32 is provided with a spiral-shaped cam groove 33 on its disc face, and an outer peripheral face 32a of the worm wheel 32 and an inner side wall of the cam groove 33 are set as a cam face 35. Further, by forward rotation of the electric motor 31, the worm gear rotates the worm wheel 32 in a lock-release direction, and by reverse rotation of the electric motor 31, the worm gear rotates the worm wheel 32 in a locking direction. The drive means 30 is accommodated in a motor case 34 in a state that the worm gear is engaged with the worm wheel 32 as a unit, and is arranged in the housing chamber 13 together with the motor case 34.

The control board 40 externally supplies electric power to the electric motor 31 and performs the control of forward rotation, reverse rotation and stopping.

The lock member 50 is composed of the lock body 51 whose front end which becomes an advancing side end engages with an engagement groove 81 provided on an outer peripheral face of the steering shaft 80, and the hanger 52 which is engageably/disengageably linked with a rear end side which becomes a retreating side end of the lock body 51. Moreover, the lock body 51 is biased toward the front end side by a lock biasing member 53. Further, the lock body 51 and the hanger 52 that constitute the lock member 50 are slidably arranged in the guide hole 14 of the guide part 12 in a linked state by engaging in a longitudinal direction of the lock member 50. In other words, the linkage portion 50a of the lock body 51 and the hanger 52 is composed of a body-side linkage part 51b provided at the rear end of the lock body 51 and a hanger-side linkage part 52b provided at the front end of the hanger 52. Thus, the lock member 50 becomes freely displaced between the steering lock position which becomes the advancing end and the steering lock release position which becomes the retreating end by the drive means 30. Further, in the steering lock position, the front end of the lock body 51 protrudes from the guide part 12 to engage with the engagement groove 81 to restrict rotation of the steering shaft 80. Moreover, in the steering lock release position, the front end of the lock body 51 retreats within the guide part 12 to be separated from the engagement groove 81 so that rotation of the steering shaft 80 becomes possible.

The lock body 51 is made of a plate-like hard member, and its front end is set as an engagement part 51a that engages with the engagement groove 81 and its rear end is set as the body-side linkage part 51b that is linked with the hanger 52. The body-side linkage part 51b is formed into an L-shape with a body-side neck part 51c that extends in the sliding direction and a body-side linkage protrusion 51d that protrudes from the rear end of the body-side neck part 51c to be orthogonal with respect to the sliding direction.

The hanger 52 is composed of a member that has lower load resistance than the lock body 51. The hanger 52 is provided with a hanger-side linkage part 52b, a following protrusion 52e, and a stopper 52f. The hanger-side linkage part 52b is arranged on the front end of the hanger 52, and formed into an L-shape with a hanger-side neck part 52c and a hanger-side linkage protrusion 52d. The hanger-side neck part 52c is thinner than other general part of the hanger 52 and extends in the sliding direction of the lock member 50. The hanger-side linkage protrusion 52d protrudes from the front end of the hanger-side neck part 52c to be orthogonal with respect to the sliding direction from the deeper side to the nearer side (from the left side to the right side in FIG. 17) with respect to the given load entry direction X.

The following protrusion 52e is positioned at the rear end of the hanger 52 to protrude toward the worm wheel 32. The following protrusion 52e is arranged within the cam groove 33 in a state that the lock member 50 is assembled in the guide hole 14 and the worm wheel 32 is installed in the housing chamber 13. Further, when the worm wheel 32 makes forward rotation or reverse rotation, the following protrusion 52e follows while abutting the cam face 35 by receiving the biasing force of the lock biasing member 53.

The stopper 52f is positioned on the rear end of the hanger 52 and protrudes on the back side of the face on which the following protrusion 52e is arranged. The stopper 52f slides with the hanger 52. Moreover, the stopper 52f is formed such that it engages with the stopper receiving part 18 at the steering lock position with respect to the locking direction.

The lock biasing member 53 is made of a coil spring and is arranged at the retreating end side of the lock body region 14a in a compressed state. Further, it biases the lock body 51 from the rear end side toward the front end side by the compression reaction force of the coil spring.

The auxiliary lock mechanism 60 is composed of an auxiliary lock member 61, an auxiliary lock biasing member 62, a holding mechanism 63, and an auxiliary lock receiving part 64.

The auxiliary lock member 61 is arranged within the auxiliary lock hole 16 to be slidable between an auxiliary lock stand-by position at which it is positioned within the auxiliary lock hole 16 and an auxiliary lock position at which it protrudes from the auxiliary lock hole 16 to engage with the auxiliary lock receiving part 64 so as to obstruct displacement of the hanger 52. The auxiliary lock member 61 is formed of a rectangular plate-like member that is long in its sliding direction.

The auxiliary lock biasing member 62 is made of a coil spring and is arranged rearward of the sliding direction of the auxiliary lock member 61 in a compressed state. Further, it biases the auxiliary lock member 61 from the auxiliary lock stand-by position side toward the auxiliary lock position side by the compression reaction force of the coil spring.

The auxiliary lock receiving part 64 is composed of a lock-release side receiving part 64a and a locking side receiving part 64b.

The lock-release side receiving part 64a is made of a recess formed on an edge part of the lock body 51, and is formed at a position at which the auxiliary lock member 61 can engage in a state that the lock body 51 is positioned in the steering lock release position.

The locking side receiving part 64b is made of a groove-shaped recess formed at an edge part of the lock body 51, and is formed at a position at which the auxiliary lock member 61 can engage in a state that lock body 51 is positioned in the steering lock position.

The holding mechanism 63 is composed of a holding member 63a and a holding biasing member 63b.

The holding member 63a is composed of a crank-shaped plate-like member, and is extractably arranged within a later-described holding hole 17.

The holding biasing member 63b is made of a coil spring and is arranged in a compressed state between the bottom part of the housing chamber 13 and a step part 63c of the holding member 63a. Further, the holding member 63a is biased to be held on the inner face of the frame cover 20 by the compression reaction force of the holding biasing member 63b.

Figure 16:
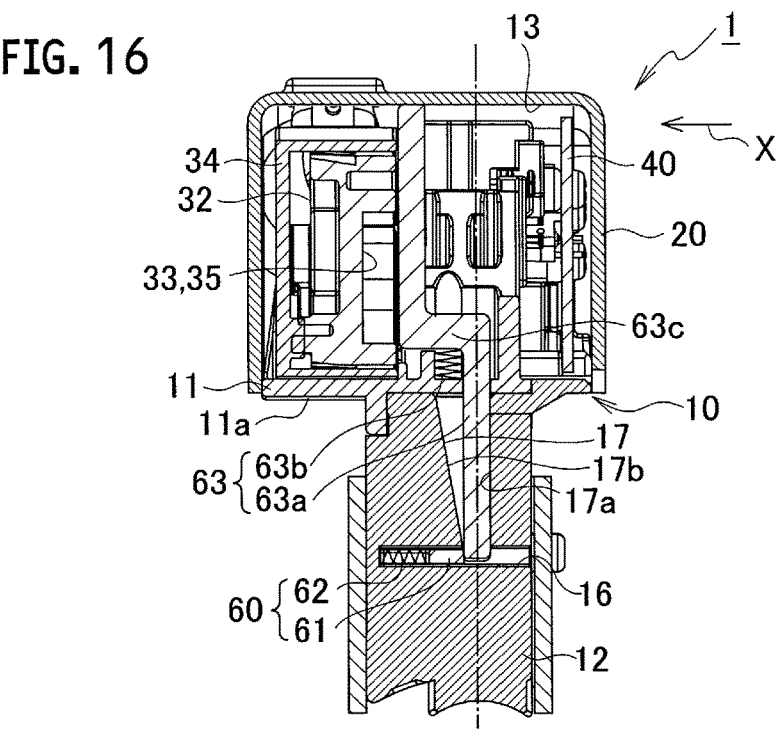
FIG. 16 is a cross sectional view taken along line 6-6 of FIG. 3 showing a state before excessive external force is applied at the time of lock release.

The holding hole 17 is set to communicate the housing chamber 13 and the auxiliary lock hole 16 along the guide hole 14 in the guide part 12. The holding hole 17 has its hole wall 17a on the nearer side with respect to the load entry direction X (the hole wall on the right side of the holding hole 17 in FIG. 16) formed to be parallel to the sliding direction of the lock member 50. Moreover, the holding hole 17 has its hole wall 17b on the deeper side with respect to the load entry direction X (the hole wall on the left side of the holding hole 17 in FIG. 16) formed obliquely with respect to the sliding direction of the lock member 50 such that it comes closer to the hole wall 17a on the nearer side from the housing chamber 13 side toward the auxiliary lock hole 16 side. In other words, regarding the dimension along the load entry direction X, the holding hole 17 is set to have a larger dimension at the engagement structure 15 side as a fragile part than at the auxiliary lock member 61 side, in a generally V shape.

Thus, the holding mechanism 63 is held in a state that a tip of the holding mechanism 63 protrudes from the holding hole 17 while the inner face of the frame cover 20 compresses the holding biasing member 63b in a state that the frame cover 20 is assembled to the frame 10. Further, by the tip of the holding mechanism 63 protruding from the holding hole 17, the tip of the holding mechanism 63 engages with the auxiliary lock member 61 positioned in the auxiliary lock stand-by position to hold the auxiliary lock member 61 in the auxiliary lock stand-by position.

Next, in the above structure, operations of the electric steering lock device 1 will be explained. First, as shown in FIG. 4-FIG. 7, in the electric steering lock device 1 in a lock release state, the lock body 51 is pulled inward of the guide hole 14 to be positioned in a steering lock release position. Therefore, engagement between the engagement part 51a of the lock body 51 and the engagement groove 81 of the steering shaft 80 is released so as to enable rotation of the steering shaft 80. Further, the auxiliary lock member 61 is held in the auxiliary lock stand-by position by the holding member 63a. Moreover, in a state that the lock body 51 is positioned in the steering lock release position, the lock-release side receiving part 64a directly faces the auxiliary lock hole 16.

Next, when a locking signal is inputted to the electric steering lock device 1 by the control board 40 from the vehicle body side, the control board 40 supplies electric power to reverse-rotate the electric motor 31. When the electric motor 31 is reverse-rotated, the worm wheel 32 rotates in the locking direction (counterclockwise in FIG. 4) through the worm gear. When the worm wheel 32 rotates in the locking direction, the following protrusion 52e follows on the cam face 35 by the biasing force of the lock biasing member 53, and the lock member 50 moves from the steering lock release position to the steering lock position. Then, when the lock member 50 reaches the steering lock position, the stopper 52f engages with the stopper receiving part 18 of the guide hole 14 and a sensor (not shown) reacts, by which the electric power from the control board 40 to the electric motor 31 is stopped and the electric motor 31 is stopped.

Further, as shown in FIG. 8-FIG. 11, in the electric steering lock device 1 in a locked state, the lock body 51 is positioned in the steering lock position in which the lock body 51 protrudes from the guide part 12. Therefore, the engagement part 51a engages with the engagement groove 81 of the steering shaft 80 to restrict rotation of the steering shaft 80.

In addition, since the state in which the stopper 52f abuts the stopper receiving part 18 is maintained by the biasing force of the lock biasing member 53, the lock member 50 that is positioned in the steering lock position is held in the steering lock position. Moreover, in a case that the engagement part 51a of the lock body 51 runs onto a protrusion portion 82 that constitutes the engagement groove 81 of the steering shaft 80 when it moves to the steering lock position, the lock biasing member 53 is compressed to shrink and the hanger 52 moves to the steering lock position in a state that the lock body 51 remains to run on the protrusion portion 82. Then, when the steering shaft 80 rotates and the protrusion portion 82 slips off from the engagement part 51a of the lock body 51, the engagement part 51a engages with the engagement groove 81 by the biasing force of the lock biasing member 53 to restrict rotation of the steering shaft 80.

Moreover, when a lock release signal is inputted to the electric steering lock device 1 in the locked state, the control board 40 supplies electric power to forward-rotate the electric motor 31. When the electric motor 31 is forward-rotated, the worm wheel 32 rotates in the lock release direction (clockwise in FIG. 8) through the worm gear. When the worm wheel 32 rotates in the lock release direction, the following protrusion 52e which has been separated from the cam face 35 follows the cam face 35, and the lock member 50 moves from the steering lock position to the steering lock release position. Then, when movement of the lock member 50 to the steering lock release position has been completed, a sensor (not shown) reacts, by which the electric power from the control board 40 to the electric motor 31 is stopped and the electric motor 31 is stopped. Further, in a state that the lock body 51 moves to the steering lock release position to be pulled inward of the guide hole 14, engagement between the engagement part 51a of the lock body 51 and the engagement groove 81 of the steering shaft 80 is released to enable rotation of the steering shaft 80.

Figure 12:
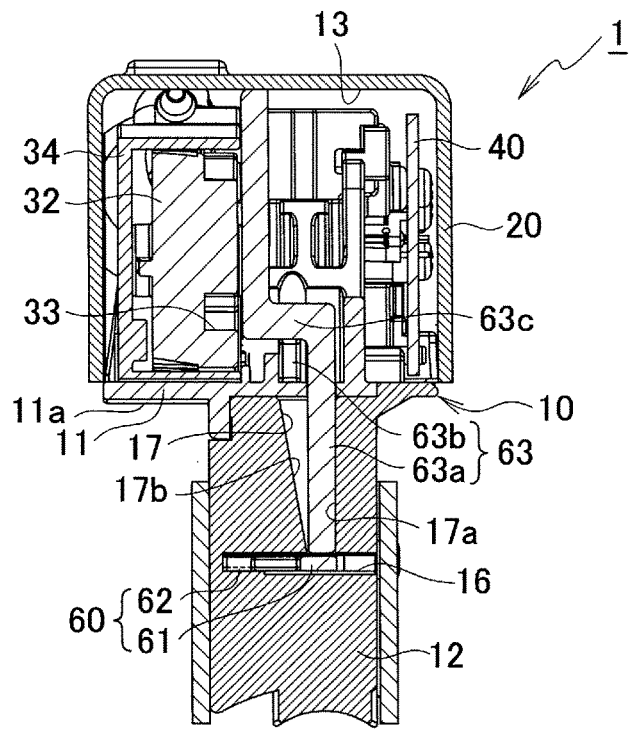
FIG. 12 is a cross sectional view taken along line 6-6 of FIG. 3 showing a state in which a frame cover is disconnected and an auxiliary lock mechanism is operated at the time of lock release.
Figure 13:
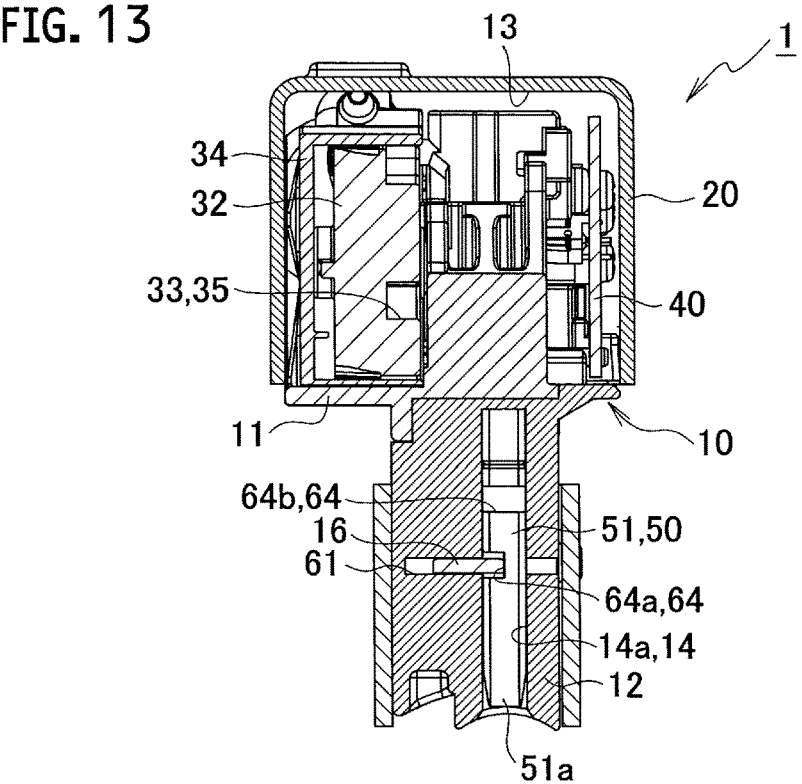
FIG. 13 is a cross sectional view taken along line 7-7 of FIG. 3 showing a state in which the frame cover is disconnected and the auxiliary lock mechanism is operated at the time of lock release.
Figure 14:
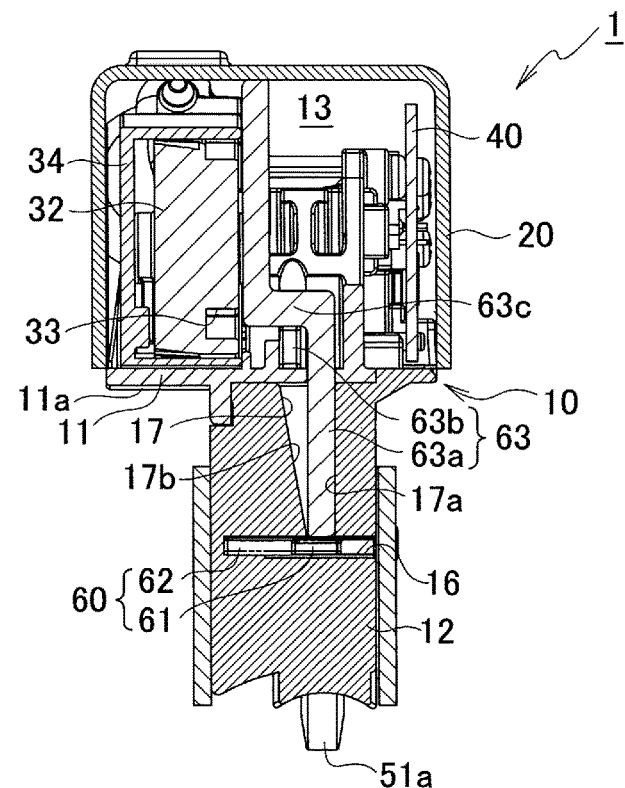
FIG. 14 is a cross sectional view taken along line 6-6 of FIG. 3 showing a state in which the frame cover is disconnected and the auxiliary lock mechanism is operated at the time of locking.
Figure 15:
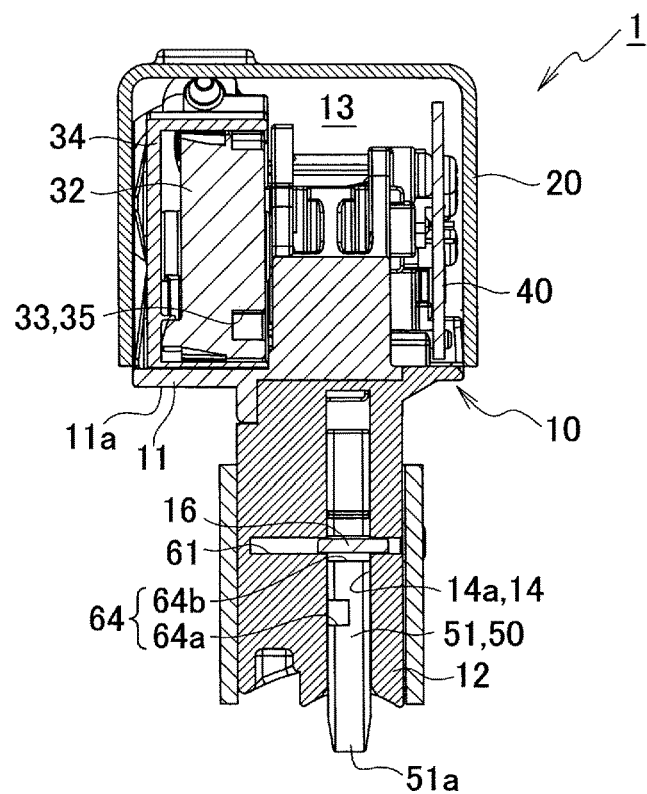
FIG. 15 is a cross sectional view taken along line 7-7 of FIG. 3 showing a state in which the frame cover is disconnected and the auxiliary lock mechanism is operated at the time of locking.

Next, in a case that external force is applied to the electric steering lock device 1 and the frame cover 20 falls off from the frame 10, as shown in FIG. 12-FIG. 15, by the compression reaction force of the holding biasing member 63b, the holding member 63a moves upward in the figure within the holding hole 17. Then, the engagement between the holding member 63a and the auxiliary lock member 61 is released, and the auxiliary lock member 61 moves to an auxiliary lock position. In a case that it was in a lock release state when the frame cover 20 falls off, as shown in FIG. 12 and FIG. 13, the auxiliary lock member 61 is inserted into the lock-release side receiving part 64a by the auxiliary lock member 61 moving to the auxiliary lock position. Then, the auxiliary lock member 61 engages with the lock-release side receiving part 64a, and movement of the lock body 51 toward the steering lock position is restricted. Moreover, in a case that it was in a locked state when the frame cover 20 falls off, as shown in FIG. 14 and FIG. 15, the auxiliary lock member 61 is inserted into the locking side receiving part 64b. Then, the auxiliary lock member 61 engages with the locking side receiving part 64b, and movement of the lock body 51 toward the steering lock release position is restricted.

Furthermore, in a case that external force that exceeds a set value is applied to the electric steering lock device 1 in a lock release state from the given load entry direction X, as shown in FIG. 16-FIG. 20, the engagement between the engagement recess 15a and the engagement protrusion 15b is disconnected. By the engagement of the engagement recess 15a and the engagement protrusion 15b being disconnected, the holding member 63a tilts in the load entry direction X along with the case part 11, and the engagement with the auxiliary lock member 61 is disconnected, and the auxiliary lock member 61 moves to the auxiliary lock position.

Further, when the case part 11 falls off from the guide part 12 while being tilted in the load entry direction X, force heading from the tip end side of the lock body 51 toward the bottom end side is applied from the hanger-side linkage part 52b to the body-side linkage part 51b, and the lock body 51 moves toward the lock release direction. With this, delay occurs from the time when the frame 10 is separated before the linkage of the linkage portion 50a is disconnected. Furthermore, when the hanger-side linkage part 52b has fallen off from the body-side linkage part 51b, the lock body 51 moves to the steering lock release position, and the auxiliary lock member 61 is inserted into the lock-release side receiving part 64a. Then, the auxiliary lock member 61 engages with the lock-release side receiving part 64a, and movement of the lock body 51 toward the steering lock position is restricted.

In addition, in a case that external force that exceeds a set value is applied to the electric steering lock device 1 in a locked state from the given load entry direction X, the engagement between the engagement recess 15a and the engagement protrusion 15b is disconnected, and the case part 11 falls off from the guide part 12 in the load entry direction. With this, the holding member 63a comes off from the holding hole 17 while tilting in the load entry direction X. Then, by the holding member 63a tilting in the load entry direction X, the engagement between the holding member 63a and the auxiliary lock member 61 is released, and the auxiliary lock member 61 moves to the auxiliary lock position. Further, by the movement of the auxiliary lock member 61 to the auxiliary lock position, the auxiliary lock member 61 engages with the locking side receiving part 64b, and the movement of the lock body 51 toward the steering lock release position is restricted.

According to the above structure, in the electric steering lock device 1 according to the embodiment, since the fragile part of the frame 10 is made of the engagement structure 15 composed of the engagement recess 15a and the engagement protrusion 15b, the load at the time of separation can be made smaller as compared with the case of breaking. Moreover, in an operation to release the engagement of the hanger 52 and the lock body 51, a load at the time of separation can be made smaller as compared with an operation in which the hanger 52 breaks. Therefore, it becomes possible to make the auxiliary lock mechanism 60 function certainly as compared with a structure in which the guide part 12 and the hanger 52 are broken.

Moreover, by arranging the engagement structure 15 at a position of the guide part 12 that overlaps with the linkage portion 50a of the lock member 50 positioned at the steering lock release position, the linkage portion 50a becomes exposed from an opening of the guide hole 14 after the frame 10 has been separated. In other words, since a space is formed around the linkage portion 50a when the engagement structure 15 is separated, play is generated at the linkage portion 50a, and the timing that the linkage of the linkage portion 50a is disconnected can be delayed as compared with the timing that the engagement structure 15 is separated. Thus, since additional time is generated for the auxiliary lock member 61 of the auxiliary lock mechanism 60 to move to the auxiliary lock position, it is possible to make the auxiliary lock mechanism 60 act certainly.

Since the holding hole 17 has the V-shape, when external force is applied to the frame 10 along the given load entry direction X, the holding member 63a falls within the holding hole 17 and the engagement between the holding member 63a and the auxiliary lock member 61 can be released. Thus, it is possible to shorten the time for the auxiliary lock mechanism 60 to function, and it is possible to make the auxiliary lock mechanism 60 act certainly.

Since the hanger-side linkage part 52b is composed of an L-shaped protrusion that protrudes from the deeper side to the nearer side with respect to the given load entry direction X, when the frame 10 is separated, force that heads from the tip end side of the lock body 51 to the bottom end side is applied from the hanger-side linkage part 52b to the body-side linkage part 51b. Thus, the hanger 52 pulls up the lock body 51 toward the steering lock release position side, and the linkage between the hanger 52 and the lock body 51 is disconnected after the auxiliary lock member 61 has reached the lock body 51. In other words, since additional time is generated for the auxiliary lock member 61 of the auxiliary lock mechanism 60 to move to the auxiliary lock position, it is possible to make the auxiliary lock mechanism 60 act certainly.

As a comparative example, a structure in which the hanger 52 does not pull up the lock body 51 toward the steering lock release position side when the guide part 12 is separated will be explained. In a case of such a structure, when the guide part 12 is separated, depending on the timing that the holding member 63a is separated from the auxiliary lock member 61 or the like, it is possible that actuation of the auxiliary lock mechanism 60 may be delayed and the lock body 51 may move toward the steering lock position side. Then, there occurs a possibility that the position of the lock-release side receiving part 64a which was directly facing the auxiliary lock hole 16 may be shifted before the auxiliary lock member 61 moves to the auxiliary lock position by the lock body 51 moving toward the steering lock position side, and the auxiliary lock member 61 may not be able to engage with the lock-release side receiving part 64a.

However, according to the present embodiment, when the guide part 12 is separated, the hanger 52 pulls up the lock body 51 toward the steering lock release position side. Therefore, although the lock-release side receiving part 64a shifts toward the steering lock release position side from the auxiliary lock hole 16 which was directly facing, when the linkage between the hanger 52 and the lock body 51 is disconnected and the lock body 51 moves toward the steering lock position side, it passes in front of the auxiliary lock hole 16 again. Therefore, even in a case that actuation of the auxiliary lock mechanism 60 is delayed, the auxiliary lock member 61 can move to the auxiliary lock position side before the lock-release side receiving part 64a passes in front of the auxiliary lock hole 16 again, and it is possible to engage with the lock-release side receiving part 64a.

By providing the separation region 14c at a position of the guide hole 14 that overlaps with the linkage portion 50a of the lock member 50 positioned in the steering lock release position, a larger space is formed around the linkage portion 50a. Thus, due to play generated at the linkage portion 50a, the timing that the linkage of the linkage portion 50a is disconnected can be delayed further as compared with the timing that the engagement structure 15 is separated.

Moreover, by providing the separation region 14c, since a sufficient space is secured for disconnecting the linkage of the linkage portion 50a, it is possible to disconnect linkage of the linkage portion 50a more certainly. Thus, it is possible to prevent such an unexpected phenomenon in which the frame 10 is separated by the hanger-side linkage part 52b breaking without disconnection of the linkage of the linkage portion, and it is possible to reduce the load at the time of separation.

While the fragile part according to the present embodiment is composed of the engagement structure 15, it may also have a structure in which a groove is formed on the outer periphery of the guide part 12 along the load entry direction X to be constricted narrowly to lower the load resistance as compared with other general parts. In a case of such a structure, the structure of the frame 10 can be simplified and weight reduction of the device as a whole can be sought.

Further, in the electric steering lock device according to the present embodiment, the auxiliary lock member 61 is arranged at the guide part 12 and the auxiliary lock receiving part 64 is arranged at the lock body 51; however, similar operations and advantageous effects can be achieved by arranging the auxiliary lock member at the lock body and arranging the auxiliary lock receiving part at the guide part.

What is claimed is:
1. A steering lock device, comprising:
a lock member arranged to be displaceable between a steering lock release position at which it is accommodated within a guide hole formed in a guide part that constitutes a frame and a steering lock position at which its tip protrudes from the guide part, the lock member having a hanger and a lock body that are disengageably linked;
an auxiliary lock mechanism that comprises:
an auxiliary lock receiving part arranged on either one of the guide part or the lock body,
an auxiliary lock member arranged on the other of the guide part or the lock body to be biased toward the auxiliary lock receiving part, and arranged to be displaceable between an auxiliary lock position at which it engages with the auxiliary lock receiving part and an auxiliary lock stand-by position at which it does not engage with the auxiliary lock receiving part, and
a holding member that engages with the auxiliary lock member and holds the auxiliary lock member in the auxiliary lock stand-by position,
wherein the auxiliary lock mechanism restricts displacement of the lock member positioned in the steering lock release position by the auxiliary lock member moving to the auxiliary lock position to engage with the lock member when engagement of the holding member and the auxiliary lock member is released; and
a fragile part provided on the guide part at a position that overlaps with a linkage portion between the hanger and the lock body of the lock member positioned in the steering lock release position, the fragile part being set to have lower load resistance than other positions of the frame,
wherein at the linkage portion between the hanger and the lock body, a hanger-side linkage part provided on the hanger is composed of an L-shaped protrusion that protrudes orthogonally to a sliding direction of the lock member,
wherein at the linkage portion, the hanger and the lock body are linked by the hanger-side linkage part and a body-side linkage part provided on the lock body engaging in a longitudinal direction of the lock member,
and wherein a holding hole which is formed in the guide part and in which the holding member is arranged is set to have a larger dimension on a fragile part side than a dimension on an auxiliary lock member side, in a generally V shape, wherein in a case that external force is applied to the frame, the holding member tilts to release the engagement between the holding member and the auxiliary lock member, wherein, by arranging the fragile part at a position of the guide part that overlaps with the linkage portion of the lock member positioned at the steering lock release position, the linkage portion becomes exposed from the fragile part after separation so that a space formed around the linkage portion when the fragile part separates results in the generation of play at the linkage portion, and delays timing of disconnection of linkage parts of the linkage portion as compared with the timing of separation on of the fragile part, thereby assuring movement of the auxiliary lock mechanism to the auxiliary lock position.

2. The steering lock device according to claim 1, wherein a position of the guide hole that overlaps with the fragile part expands to form a space for a separation region around the linkage portion.

3. A steering lock device, comprising:

a lock member arranged to be displaceable between a steering lock release position at which it is accommodated within a guide hole formed in a guide part that constitutes a frame and a steering lock position at which its tip protrudes from the guide part, the lock member having a hanger and a lock body that are disengageably linked;

an auxiliary lock mechanism that comprises:

an auxiliary lock receiving part arranged on either one of the guide part or the lock body, an auxiliary lock member arranged on the other of the guide part or the lock body to be biased toward the auxiliary lock receiving part, and arranged to be displaceable between an auxiliary lock position at which it engages with the auxiliary lock receiving part and an auxiliary lock stand-by position at which it does not engage with the auxiliary lock receiving part, and a holding member that engages with the auxiliary lock member and holds the auxiliary lock member in the auxiliary lock stand-by position, wherein the auxiliary lock mechanism restricts displacement of the lock member positioned in the steering lock release position by the auxiliary lock member moving to the auxiliary lock position to engage with the lock member when engagement of the holding member and the auxiliary lock member is released; and a fragile part provided on the guide part at a position that overlaps with a linkage portion between the hanger and the lock body of the lock member positioned in the steering lock release position, the fragile part being set to have lower load resistance than other positions of the frame, wherein a holding hole which is formed in the guide part and in which the holding member is arranged is set to have a larger dimension on a fragile part side than a dimension on an auxiliary lock member side, in a generally V shape, wherein in a case that external force is applied to the frame, the holding member tilts to release the engagement between the holding member and the auxiliary lock member, wherein, by arranging the fragile part at a position of the guide part that overlaps with the linkage portion of the lock member positioned at the steering lock release position, the linkage portion becomes exposed from the fragile part after separation so that a space formed around the linkage portion when the fragile part separates results in the generation of play at the linkage portion, and delays timing of disconnection of linkage parts of the linkage portion as compared with the timing of separation of the fragile part, thereby assuring movement of the auxiliary lock mechanism to the auxiliary lock position, and wherein the holding member is biased on an inner face of the frame by a holding biasing member.

4. A steering lock device, comprising:

a lock member arranged to be displaceable between a steering lock release position at which it is accommodated within a guide hole formed in a guide part that constitutes a frame and a steering lock position at which its tip protrudes from the guide part, the lock member having a hanger and a lock body that are disengageably linked;

an auxiliary lock mechanism that comprises:

an auxiliary lock receiving part arranged on either one of the guide part or the lock body, an auxiliary lock member arranged on the other of the guide part or the lock body to be biased toward the auxiliary lock receiving part, and arranged to be displaceable between an auxiliary lock position at which it engages with the auxiliary lock receiving part and an auxiliary lock stand-by position at which it does not engage with the auxiliary lock receiving part, and a holding member that engages with the auxiliary lock member and holds the auxiliary lock member in the auxiliary lock stand-by position, wherein the auxiliary lock mechanism restricts displacement of the lock member positioned in the steering lock release position by the auxiliary lock member moving to the auxiliary lock position to engage with the lock member when engagement of the holding member and the auxiliary lock member is released; and a fragile part provided on the guide part at a position that overlaps with a linkage portion between the hanger and the lock body of the lock member positioned in the steering lock release position, the fragile part being set to have lower load resistance than other positions of the frame, wherein a holding hole which is formed in the guide part and in which the holding member is arranged is set to have a larger dimension on a fragile part side than a dimension on an auxiliary lock member side, in a generally V shape, wherein in a case that external force is applied to the frame, the holding member tilts to release the engagement between the holding member and the auxiliary lock member, wherein, by arranging the fragile part at a position of the guide part that overlaps with the linkage portion of the lock member positioned at the steering lock release position, the linkage portion becomes exposed from the fragile part after separation so that a space formed around the linkage portion when the fragile part separates results in the generation of play at the linkage portion, and delays timing of disconnection of linkage parts of the linkage portion as compared with the timing of separation of the fragile part, thereby assuring movement of the auxiliary lock mechanism to the auxiliary lock position, and wherein the fragile part comprises an engagement structure having an engagement recess and an engagement protrusion, with the guide part and a case linked by an engagement of the engagement recess and engagement protrusion to form the frame.

* * * * *